United States Patent [19]
Dahlquist

[11] 3,867,922
[45] Feb. 25, 1975

[54] STOVE

[76] Inventor: Emil F. Dahlquist, 31 Morgan Pk., Clinton, Conn. 06413

[22] Filed: Jan. 24, 1974

[21] Appl. No.: 436,189

[52] U.S. Cl................ 126/274, 99/340, 99/447, 126/137
[51] Int. Cl.............................................. A21b 1/52
[58] Field of Search ...... 99/340, 447; 126/9 R, 126, 126/137, 270, 274

[56] References Cited
UNITED STATES PATENTS

| 323,280 | 7/1885 | Croom | 126/274 |
|---|---|---|---|
| 2,421,577 | 1/1960 | Smith | 126/274 |
| 2,520,030 | 8/1950 | Cliff | 126/274 |
| 2,580,925 | 1/1952 | Jaruis | 126/274 |
| 2,757,664 | 8/1956 | McDowell | 126/274 UX |
| 3,026,866 | 3/1962 | Lynch | 126/9 X |

Primary Examiner—William F. O'Dea
Assistant Examiner—Peter D. Ferguson
Attorney, Agent, or Firm—Delio & Montgomery

[57] ABSTRACT

A stove and oven adapted to utilize horizontally directed radiant heat energy and which comprises sidewall members with a diagonally directed baffle therebetween and a utensil supporting grill above the baffle together with a bottom wall member. The baffle and bottom wall member define an oven.

6 Claims, 6 Drawing Figures

PATENTED FEB 25 1975 3,867,922
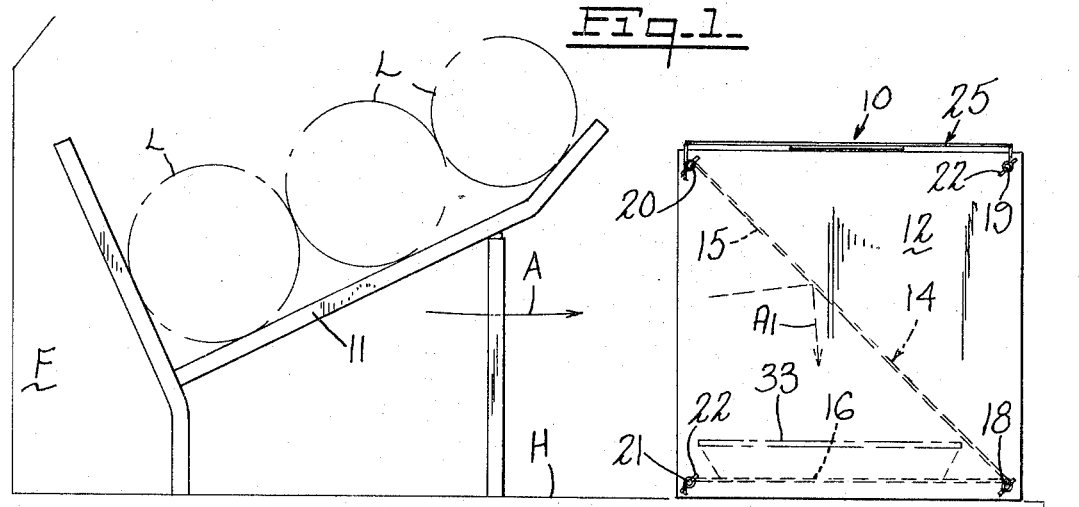
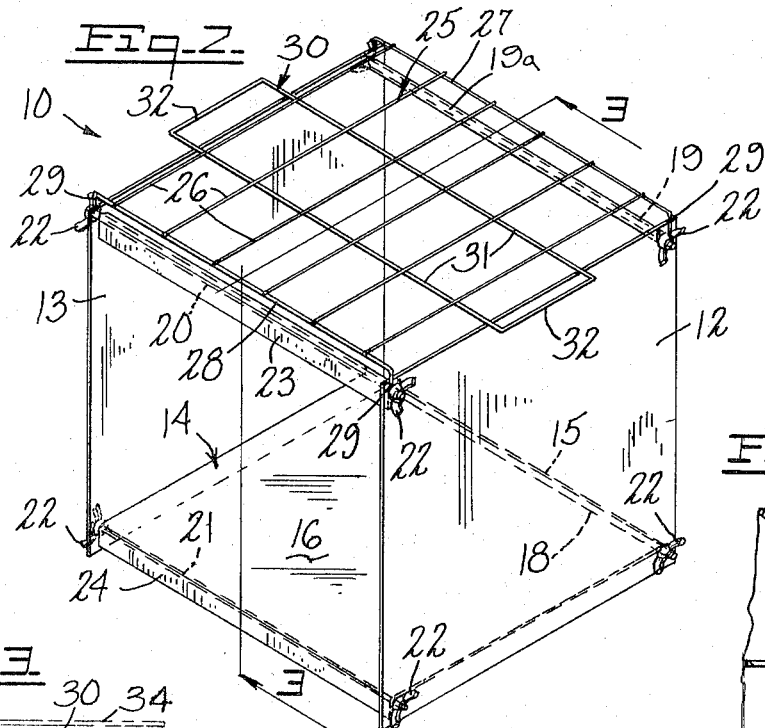
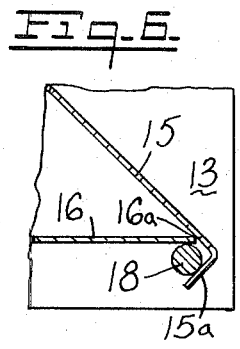
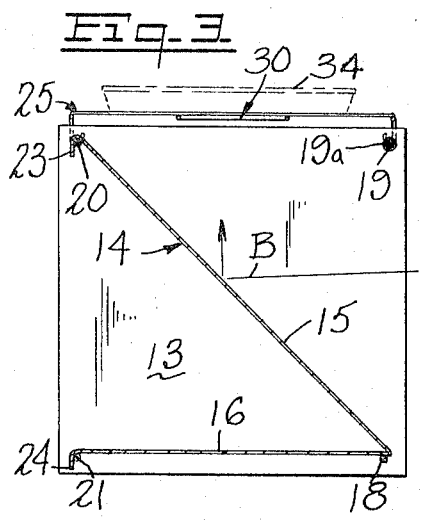
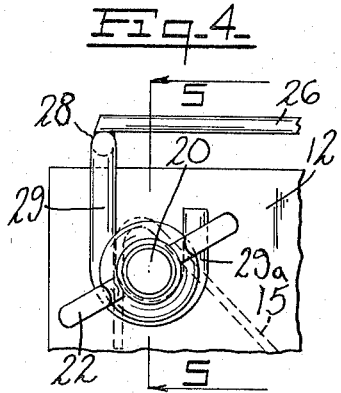
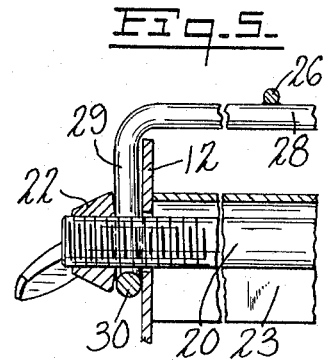

STOVE

This invention relates to cooking devices such as stoves, and more particularly relates to such a device adapted to be used with a source of generally horizontally directed radiant heat energy.

The invention provides a stove which may be utilized with a radiant heat source such as a fireplace grate as described in U.S. Pat. No. 3,771,511. This patent describes a fireplace grate which is so arranged that radiant heat energy is directed generally horizontally from the grate as logs therein burn. The present invention provides a stove and oven arrangement which may utilize such directed radiant heat energy for cooking purposes.

The invention provides a device which may be termed a hearth stove which redirects the generally horizontal radiation to a vertical direction through a utensil supporting grill in one form, and in another form directs the radiant heat energy downwardly in an oven arrangement. A device embodying the invention is simply formed and may be easily assembled or knocked down for storage purposes.

Briefly stated, the invention in one form thereof comprises a pair of sidewall members having a radiant heat energy directing baffle extending therebetween and at an angle of approximately 45° to the vertical. A utensil supporting grill is disposed above the sidewall members to support a pot or pan thereon upon which the reflected radiant energy is directed. The device may also be disposed in the opposite direction so that the baffle will direct the radiant energy downwardly to a utensil or container and provide an oven effect.

An object of this invention is to provide a new and improved stove and oven adapted to utilize radiant heat energy.

A further object of this invention is to provide a stove and oven arrangement adapted to be utilized for cooking purposes and which uses radiant heat energy emanating from a fireplace.

A further object of this invention is to provide a device of the type described which is portable and economical in construction.

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings, wherein:

FIG. 1 is a side elevation of a device embodying the invention;

FIG. 2 is a perspective view of the device of FIG. 1;

FIG. 3 is a view seen in the plane of lines 3—3 of FIG. 2;

FIG. 4 is an enlarged view of the upper left hand corner portion of the device as shown in FIG. 1;

FIG. 5 is a sectional view seen in the plane of lines 5—5 of FIG. 4; and

FIG. 6 is an enlarged view partially in section of a structural feature of the invention.

A device 10 embodying the invention is adapted to be utilized with a source of radiant heat energy such as a wood burning fireplace grate 11 of the type disclosed in U.S. Pat. No. 3,771,511, disposed in a fireplace F. The device 10 is placed on a hearth H before the grate. The radiant heat energy is exemplified by the arrow A and emanates from beneath the log-supporting portion of the grate 11 as the logs L burn. The device 10 comprises spaced apart sidewall member 12 and 13 together with an interior member 14. Interior member 14 is formed so that it provides a baffle-like portion 15 residing at substantially 45° to the horizontal as shown in FIGS. 1 and 3 and continues into a bottom wall portion 16. The sidewalls are joined together by means of a plurality or rods 18, 19, 20 and 21 which have threaded ends adapted to receive wing nuts 22 or other fastening devices. Member 14 acts to space the sidewalls apart by its width, and has a turned-over flange 23 at the upper end thereof which rests over rod 20. A second turned-over flange 24 is formed at the bottom end of member 14 and partially extends about rod 21. A spacing sleeve 19a is positioned on rod 19 to maintain the sidewalls 13 a predetermined distance apart and the bottom end portion of member 14 rests on rod 18. When the wing nuts 22 are positioned on the ends of the rods 19 - 21 and threaded thereon a rigid structure as shown in FIG. 2 results.

For ease of storage the member 14 may be formed in two portions, as shown in FIG. 6. To facilitate storage the baffle 15 and bottom member 16 may be arranged in two parts as shown in FIG. 6. There a free end 16a of bottom member 16 rests on rod 18, and the lower edge of member 15 has an approximate 90° flange 15a which turns over rod 18. With this construction, the device may be disassembled and stored substantially flat.

A supporting grill 25 comprises a plurality of rod members 26 extending between end rods 27 and 28 and are secured thereto as by welding. The ends of rods 27 and 28 are formed as shown in FIGS. 4 and 5 with a portion 29 which bends downwardly at substantially 90°, and then is formed with a U-shaped portion 29a positioned between the sidewall members and the wing nuts to mount grill 25 to the sidewall members through the rods 19 and 20. The grill may further include a reinforcing portion 30 which includes rod portions 31 disposed across rods 26, together with end portions 32. The member 30 may be formed in one continuous piece, and the end portions used as handles for positioning and carrying.

With the arrangement described, it will be seen that the device may be very easily and quickly assembled. The sidewalls and the interior baffle and floor member are formed of a highly reflective metal, preferably aluminum, so that there is a minimum of absorption of the radiant energy, and such radiant energy is directed to the appropriate position dependent upon the orientation of the device with respect to the heat source.

As exemplified in FIG. 1, the device is positioned for baking and a covered utensil 33, which may contain food such as beans adapted to be baked, receives the downwardly reflected energy exemplified by the arrow A1.

FIG. 3 exemplifies the device as it is positioned to receive radiant energy as exemplified by the arrow B from the right side thereof for regular stove top cooking purposes. Such energy is reflected by the baffle 15 upwardly through the grill 25 to the utensil 34.

The utensils 33 and 34 utilized with the stove and oven should be of the type which will absorb and/or transmit radiant heat energy such as crockery, cast iron or glass. Utensils such as aluminum or stainless steel which would tend to reflect the directed heat energy are not preferred.

It has been found that varius types of foods and meats may be fired in glass or crockery ware as exemplified by the utensil 34, while other types of foods more susceptible to baking, such as beans, are positioned in the device as indicated by utensil 33, as shown in FIG. 1.

In practice, glass utensils are preferred for use on the grill 25, and either glassware or crockery in the oven portion. The device does not become hot to the touch, and effectively reflects the incident radiant heat energy for efficient use.

It may thus be seen that the objects of the invention set forth as well as those made apparent from the preceding description are efficiently attained. While preferred embodiments of the invention have been set forth for purposes of disclosure further embodiments of the invention as well as modifications to the disclosed embodiments which do not depart from the spirit and scope of the invention may occur to others skilled in the art. Accordingly, the appended claims are intended to cover all embodiments and modifications of the invention which do not depart from the spirit and scope of the invention.

What is claimed is:

1. A stove adapted to receive radiant heat energy from a generally horizontal direction, comprising spaced apart sidewall members, a radiant heat energy reflecting member extending between said sidewall members, said reflecting member having reflecting surfaces on both sides thereof and extending substantially from a lower corner of said wall member extending between said sidewall members adjacent the lower edges thereof and below one of said reflecting surfaces, members above the other of said reflecting surfaces.

2. The stove of claim 1 wherein said bottom wall member defines with said sidewalls and said reflecting member an oven adapted to receive the generally horizontally directed radiant heat energy.

3. The device of claim 2 wherein said reflecting member and said bottom wall member space said sidewall members apart, a plurality of rods extending between said sidewall members and supporting said reflecting member and said bottom wall member thereon.

4. A cooking device adapted to receive radiant energy from a generally horizontal direction, comprising spaced apart sidewall members, a bottom wall member extending between said side wall members adjacent the lower edges thereof, a plate-like member extending between said sidewall members from adjacent a lower corner of said sidewall members diagonally to adjacent the opposite upper corner thereof over said bottom wall member, said plate-like member having surfaces on both sides thereof which are highly reflective to radiant heat energy, and an object supporting grill supported on said device above said sidewalls and said plate-like member.

5. The device of claim 4 further comprising a plurality of rods extending between said sidewalls, fastening means on the ends of said rods, said rods supporting said bottom wall member and said plate-like member between said sidewalls, said grill being connected to said rods and positioned above said sidewall members.

6. The device of claim 5 wherein said grill has four depending portions engaging said rods, said depending portions being received on said rods between the outer side of said sidewall members and said fastening means.

* * * * *

PO-1050
(5/69)

UNITED STATES PATENT OFFICE
CERTIFICATE OF CORRECTION

Patent No. 3,867,922             Dated February 25, 1975

Inventor(s)    Emil F. Dahlquist

It is certified that error appears in the above-identified patent and that said Letters Patent are hereby corrected as shown below:

Column 2, line 10, before "rods" change "or" to -- of --.
Column 3, line 3, change "varius" to -- various --.
Column 3, line 4, change "fired" to -- fried --.
Claim 1, line 7, before "wall" insert -- sidewall members diagonally to the opposite upper corner thereof, a bottom --.
Claim 1, line 9, after "surfaces," insert -- and an open object-supporting grill supported on said device closely adjacent the top of said sidewall --.

Signed and sealed this 13th day of May 1975.

(SEAL)
Attest:

RUTH C. MASON
Attesting Officer

C. MARSHALL DANN
Commissioner of Patents
and Trademarks